United States Patent [19]

Dorner

[11] Patent Number: 4,854,817
[45] Date of Patent: Aug. 8, 1989

[54] APPARATUS FOR UNSTACKING ARTICLES
[75] Inventor: Wolfgang C. Dorner, Oconomowoc, Wis.
[73] Assignee: Dorner Mfg. Corp., Hartland, Wis.
[21] Appl. No.: 109,120
[22] Filed: Oct. 16, 1987
[51] Int. Cl.$^4$ .................... B65G 47/28; B65G 59/00
[52] U.S. Cl. ............................ 414/798.9; 198/407; 198/462
[58] Field of Search ............... 198/462, 407; 414/330, 414/798.9

[56] References Cited

U.S. PATENT DOCUMENTS

| | | | |
|---|---|---|---|
| 2,781,122 | 2/1957 | Gueffroy | 198/462 |
| 3,071,236 | 1/1963 | Hahn et al. | 198/462 X |
| 4,364,466 | 12/1982 | Mojden | 414/330 X |
| 4,435,114 | 3/1984 | Fardin | 414/330 |
| 4,599,848 | 7/1986 | Bader | 198/462 X |

Primary Examiner—Frank W. Werner
Assistant Examiner—Janice Krizek
Attorney, Agent, or Firm—Andrus, Sceales, Starke & Sawall

[57] ABSTRACT

An apparatus for unstacking articles and feeding the articles to working equipment in an end-to-end uniformly spaced stream. Articles are stacked in a side-by-side relation and the stacks are conveyed in spaced relation on a conveyor. The speed of each stack is retarded while the conveyor is maintained at its operating speed to cause each succeeding stack to catch and engage the trailing end of the preceding stack. As each stack reaches the downstream end of the conveyor, each article is separated from the remainder of the stack and the article is transferred through a chute to a second conveyor, so that the articles are fed in end-to-end relation by the second conveyor to working equipment.

6 Claims, 2 Drawing Sheets

APPARATUS FOR UNSTACKING ARTICLES

BACKGROUND OF THE INVENTION

In automated conveyor systems, small articles or parts, such as video cassette containers, jewel boxes, or the like, are automatically conveyed through a series of work stations where certain working or assembly operations are performed. In such conveyor systems, it is common to stack the articles or parts in side-by-side relation and the stacks are then fed from a main conveyor onto a series of secondary conveyors where the articles are unstacked and fed to working equipment. It is important that the conveyor system meter the articles to the working equipment at the maximum rate of operation of the equipment at all times and without gaps between the articles. If there are gaps between the articles being fed to the working equipment, optimum output cannot be achieved by the equipment.

SUMMARY OF THE INVENTION

The invention is directed to a method and apparatus for unstacking articles or parts and feeding the articles to working equipment in a steady end-to-end stream with uniform spacing between the articles.

In accordance with the invention, stacks of articles are conveyed in spaced relation on a conveyor and each stack is composed of a group of articles arranged in a side-by-side relation in the machine direction, meaning that the articles are stacked in the direction of movement of the conveyor.

The speed of movement of each stack is retarded on the conveyor, while the conveyor is maintained at its operative speed, to thereby cause each succeeding stack to catch up with and engage the trailing end of the preceding stack, to thereby eliminate gaps between the stacks.

As each stack reaches the downstream end of the conveyor, each article is successively separated from the remainder of the stack and the separated article is then transferred through a chute to a second conveyor, so that the articles are fed in end-to-end relation by the second conveyor to the working equipment.

In the preferred form of the invention, the speed retarding mechanism includes a pair of driven roller assemblies which are located along the respective sides of the conveyor and are adapted to engage the side edges of the articles in the stack as the stack is conveyed by the conveyor. The roller assemblies rotate in the same direction as the conveyor, but at a substantially slower speed and thereby retard the speed of travel of the stack and permit the leading end of the next succeeding stack to engage the trailing end of the retarded stack to thereby eliminate gaps between the stacks.

As gaps between the stack are eliminated, the articles can be fed with uniform spacing to the working equipment, so that the articles can be metered to the equipment at the maximum rate of operation of the equipment at all times.

The uniform feeding of the articles to the working equipment can be achieved even though there may be substantial gaps between the stacks which can be caused by delays or stoppages of upstream equipment. As the articles are fed at a uniform rate to the working equipment, the overall production rate is substantially improved.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

The apparatus of the invention includes a frame or supporting structure 1 that supports a conveyor 2. A series of stacks 3 of articles 4 are adapted to be conveyed on conveyor 2 in spaced relation.

Figure 2:
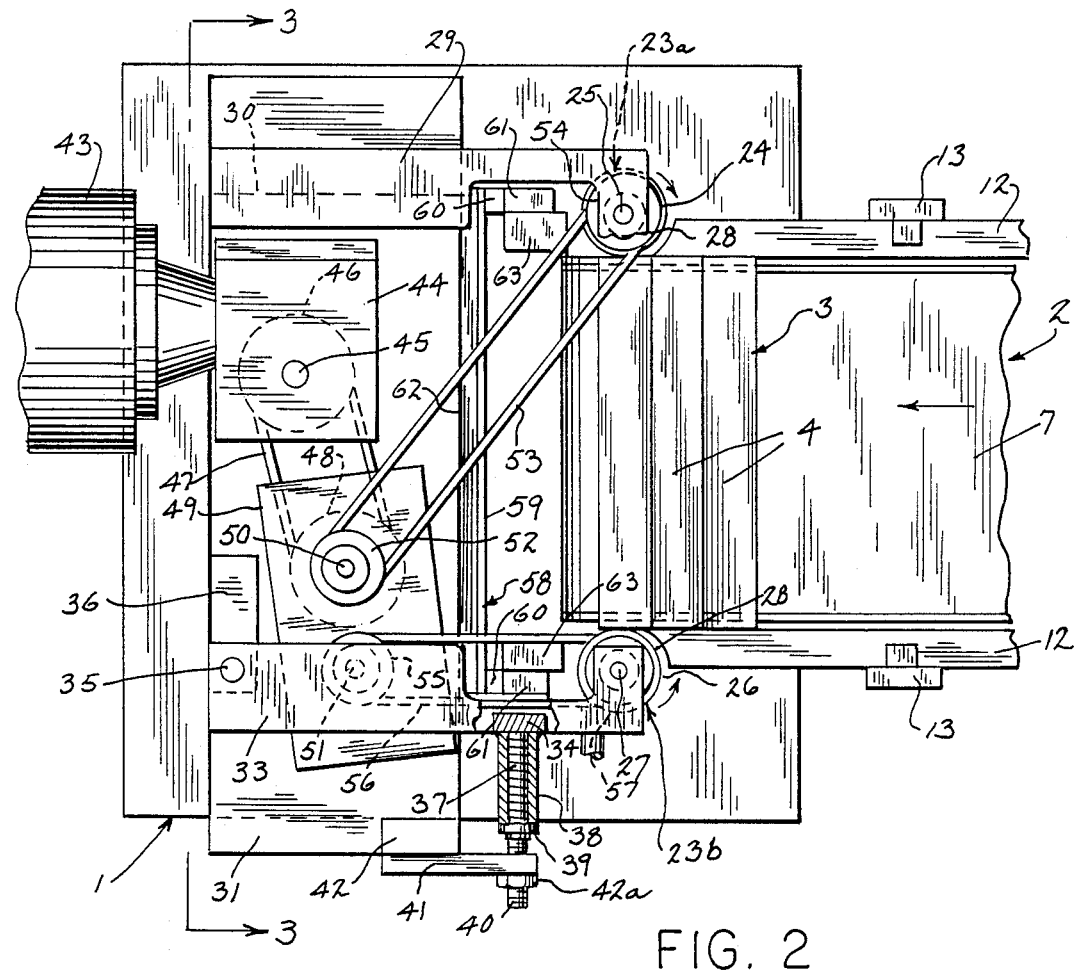
FIG. 2 is a top plan view of the apparatus.
Figure 3:
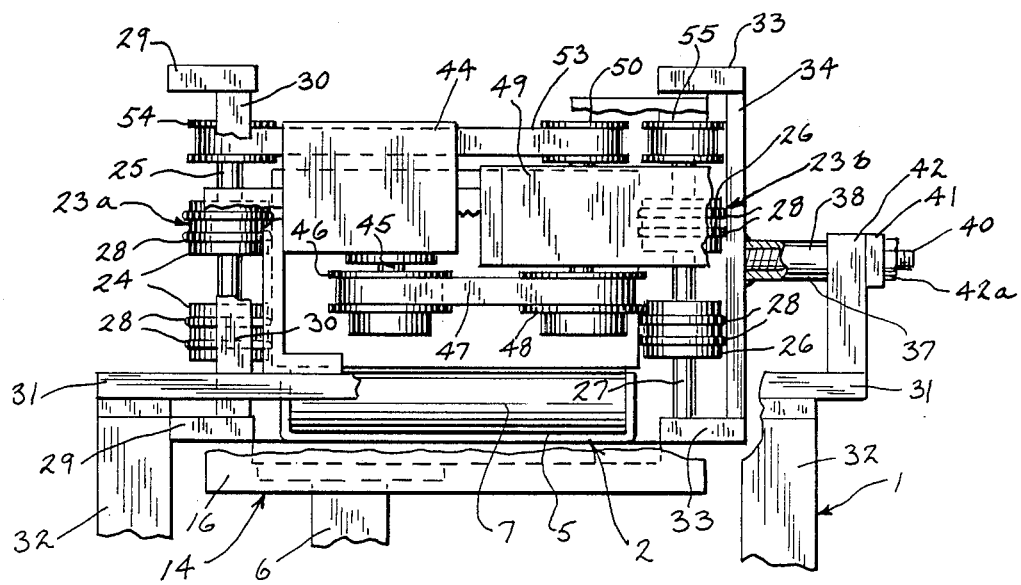
FIG. 3 is an end view taken along line 3—3 of FIG. 2.

Articles 4 can take the form of small, generally rectangular boxes or containers, such as video cassette containers, jewelry boxes, and the like, and as shown in FIG. 2, the articles are stacked in side-by-side relation in the machine direction, meaning that the articles are stacked in direction of movement of conveyor 2. In practice, a stack 3 may consist of eight to twelve articles and the spacing between the stacks on conveyor 2 can be one-half the length of a stack.

Figure 1:
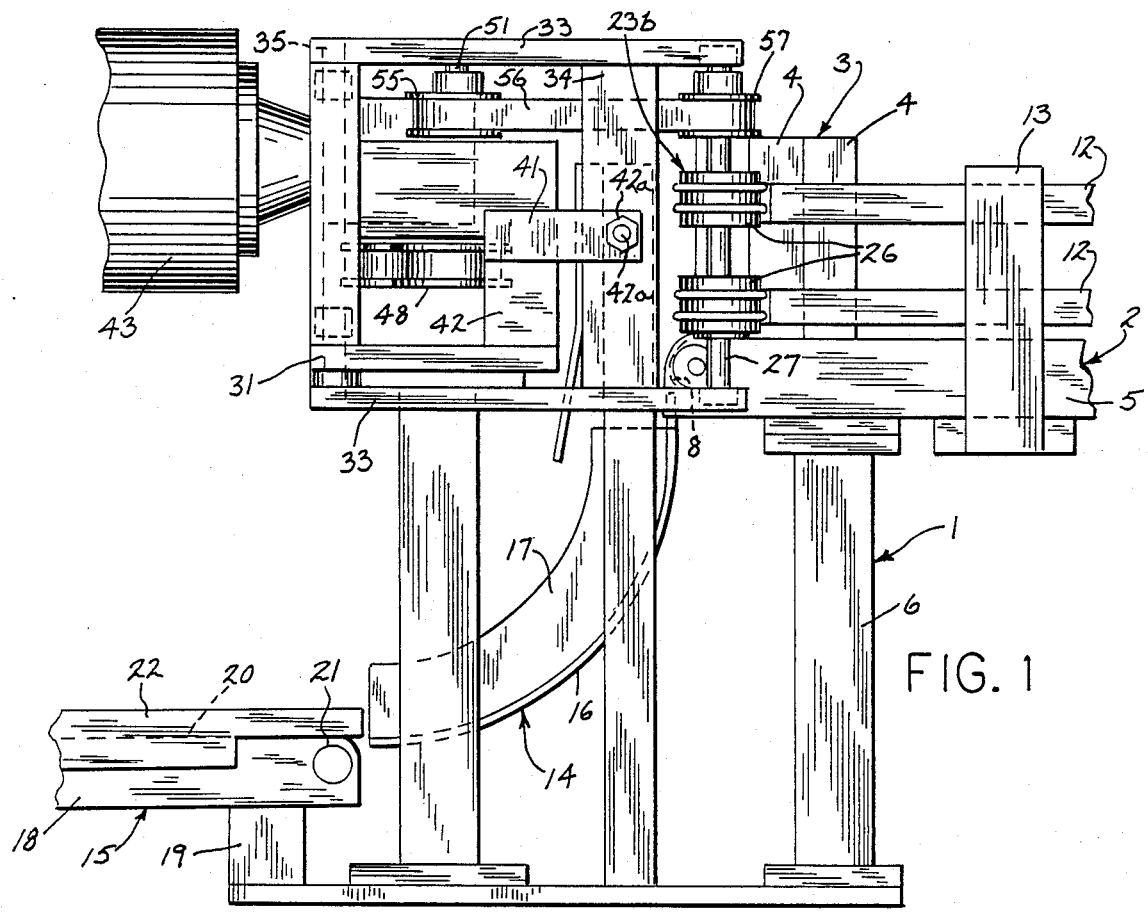
FIG. 1 is a side view of the apparatus of the invention.

Conveyor 2 consists of a generally U-shaped frame 5, which is supported by a plurality of legs 6 of frame 1. A belt 7 is mounted for endless travel on frame 5 and, as shown in FIG. 1, is supported by an idler pulley 8, and a drive pulley, not shown. Belt 7 is driven in a conventional manner through operation of a motor which operates through a gear box to rotate the drive pulley and drive belt 7.

Stacks 3 are guided in movement on conveyor 2 by guide rails 12, which are supported from frame 5 by brackets 13.

As each stack 3 reaches the downstream end of conveyor 2, the articles 4 of the stack are individually separated from the remainder of the stack and transferred through a chute 14 to a second conveyor 15, which is located at a lower elevation than conveyor 2.

As shown in FIGS. 1 and 2, chute 14 includes a generally curved bottom wall 16 and a pair of side walls 17, which extend upwardly from bottom wall 16 and guide the articles 4 as they are transferred from conveyor 2 to conveyor 15.

Conveyor 15 is constructed in a manner similar to conveyor 2 and includes a generally U-shaped frame 18, which is supported by legs 19 of frame 1. Belt 20 is mounted for endless travel on frame 18 and, as shown in FIG. 1, the upstream end of the belt is supported by an idler pulley or spindle 21, which is journalled within the side walls of frame 18. Rails 22 extend upwardly from the sides of frame 18 and guide the articles 4 in movement on conveyor 15.

In accordance with the invention, a speed retarding mechanism is employed to retard the speed of each stack 3 as it reaches the downstream end of conveyor 2. Retarding the speed of each stack enables each succeeding stack to catch up with the preceding stack and eliminate the gap between stacks.

The speed retarding mechanism includes a pair of roller assemblies 23a and 23b which are located above the respective sides of conveyor 2, as shown in FIG. 2. Roller assembly 23a is fixed in position relative to the conveyor, while the roller assembly 23b is biased inwardly.

Roller assembly 23a is composed of a series of rollers 24 that are mounted in spaced vertical relation on a shaft 25, and similarly, roller assembly 23b includes a series of rollers 26 that are secured in spaced relation on vertical shaft 27. Each roller 24 and 26 is provided with circumferential grooves and resilient O-rings 28 are mounted within the grooves. O-rings 28 provide a resilient contacting surface for engaging the opposite ends of each stack 3, as the stack approaches the downstream end of conveyor 2. The resilient nature of the O-rings 28 enables the rollers to compensate for any irregularities in the ends of the articles, as well as any deviations at the joints between articles in the stack.

Shaft 25 of roller assembly 23a is journalled for rotation between a pair of spaced parallel arms 29, and the arms are connected to a vertical plate 30 which extends upwardly from base plate 31. Base plate 31 is supported by legs 32 of frame 1. With this construction, rollers 24 are mounted in fixed relation relative to conveyor 2.

Shaft 27 which carries rollers 26 is journalled between a pair of spaced horizontal arms 33 and arms 33 are connected together by a connecting plate 34. The ends of arms 33 opposite from rollers 26 carry a vertical pivot shaft 35, which is mounted for pivotal movement within a bracket 36 that extends upwardly from base plate 31. With this arrangment, arms 33 aong with rollers 26 can be pivoted about the axis of shaft 35.

Roller assembly 23a is biased inwardly toward the stack 3 on conveyor 2 by a coil spring 37, which is positioned in sleeve 38 that extends outwardly from connecting plate 34. The head 39 of a bolt 40 is freely disposed within the sleeve 38 and bears against the end of spring 37, while the threaded stem of the bolt extends through an opening in arm 41, which is secured to the upper end of a post 42 mounted on base plate 31. A lock nut 42a is threaded on bolt 40 and the outer end of the bolt has flats to receive a tool. As shown in FIG. 2, one end of spring 37 bears against vertical plate 34, while the opposite end of the spring bears against the bolt head 39. Thus, the force of spring 37 will urge the roller assembly 23b inwardly toward the stacks 3 on conveyor 2. By rotating bolt 40, the bolt head 39 will move in or out of sleeve 38 to adjust the force of spring 37.

To drive the rollers 24 and 26, a motor 43 operates through a gear box 44 mounted through a bracket to base plate 31. The vertical output shaft 45 of gear box 44 carries a pulley 46, which is connected through belt drive 47 to a pulley 48 on the input shaft of transmission 49. Transmission 49 has a pair of output shafts 50 and 51, and a pulley 52 mounted on output shaft 50 is connected through belt drive 53 to a pulley 54 on shaft 25. Similarly, a pulley 55 mounted on output shaft 51 is connected via belt drive 56 to a pulley 57 on shaft 27.

With this construction, motor 43 will drive the rollers 24 and 26 in the direction of the arrows in FIG. 2. However, rollers 24 and 26 will be driven at a substantially slower speed than the speed of travel of belt 7, so that the speed of travel of each stack 3 is retarded as it passes between roller assemblies 23a and 23b, and is slower than the speed of travel of the succeeding stacks, which are moving on the belt 7 of conveyor 2.

Figure 4:
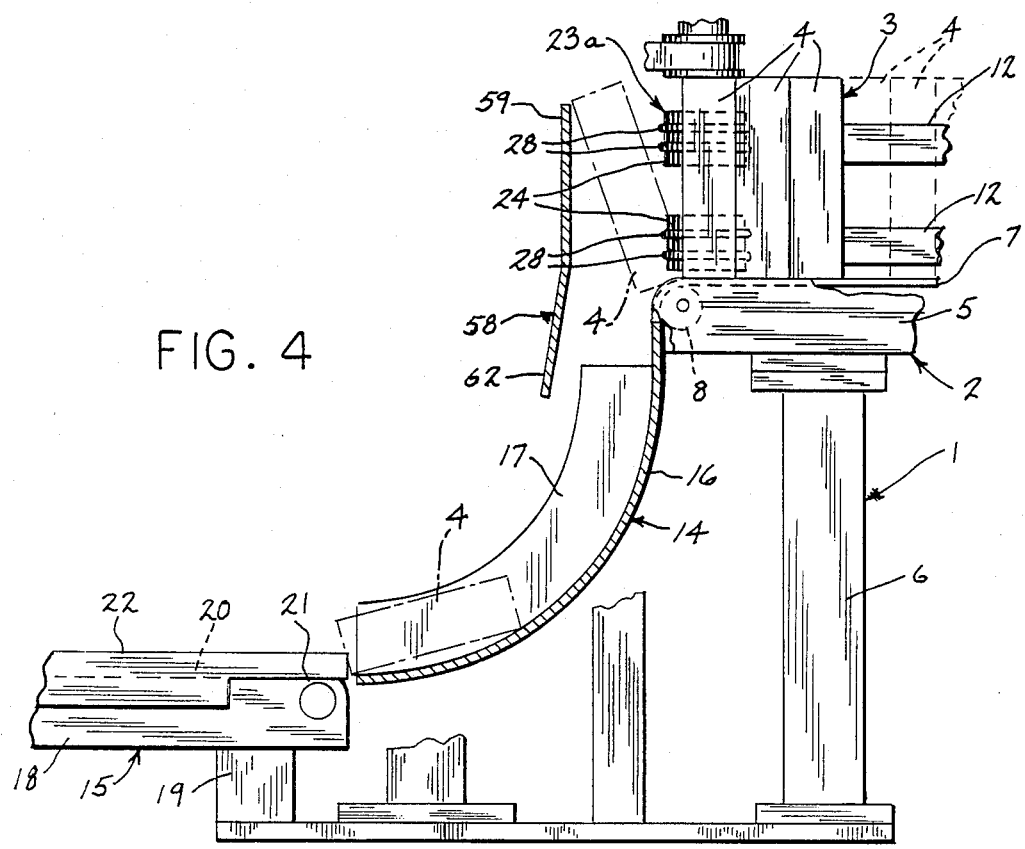
FIG. 4 is an enlarged fragmentary vertical section showing the transfer of articles from the conveyor to the transfer chute.

As each article 4 of stack 3 reaches the downstream end of conveyor 2, the article will tend to follow the circular curvature of pulley 8, as shown in FIG. 4, causing the article to tilt and separate from the remaining articles of the stack. The article will then fall from the downstream end of the conveyor and be guided by guide plate 58 onto chute 14.

Guide plate 58 extends across the width of conveyor 3 and the upper vertical end 59 of plate 58 is connected through spacers 60 to vertical supports 61, as shown in FIG. 2, which are located along the sides of conveyor 2. The lower end 62 of plate 58 is bent outwardly over chute 14.

To guide the opposite ends of each article as it is transferred to the chute, vertical guide bars 63 are attached to the respective supports 61.

In operation, stacks 3 are conveyed in spaced relation on conveyor 2 and as the leading article 4 in each stack 3 approaches the downstream end of conveyor 2, the ends of the article are engaged by the drive rollers 24 and 26, which are operating at a slower speed than the speed of belt 7, thereby causing the speed of the stack to be decreased.

As the speed of the stack is decreased, the next succeeding stack will catch up with the preceding stack to eliminate the gap between stacks.

As each article in the stack passes beyond the speed retarding roller 24 and 26, the article will then pivot away from the remainder of the stack, as shown in FIG. 4, and the article will fall from the downstream end of the conveyor into chute 14 where it will be transferred onto the conveyor 15. The articles travelling on conveyor 15 to the working equipment will be in end-to-end relation with minimum spacing between articles. Conveyor 15 serves to meter the articles to the working equipment at the maximum rate of operation of the working equipment to obtain optimum performance for the conveying system.

Various modes of carrying out the invention are contemplated as being within the scope of the following claims particularly pointing out and distinctly claiming the subject matter which is regarded as the invention.

I claim:

1. An apparatus for unstacking articles and feeding the articles in uniformly spaced relation, comprising first conveyor means to convey a plurality of stacks of articles in spaced relation and having a downstream end, said articles disposed edgewise on said first conveyor means and being stacked in side-by side relation in the direction of travel of said first conveyor means, drive means for driving said first conveyor means, second conveyor means disposed adjacent the downstream end of said first conveyor means and located at a level beneath said first conveyor means, transfer means for transferring each article of each stack from the downstream end of said first conveyor means to said second conveyor means, and speed retarding means disposed immediately adjacent said downstream end of the first conveyor means for retarding the speed of each stack to enable the leading end of each succeeding stack to engage the trailing end of each preceding stack to eliminate gaps between said stacks and form a composite stack, said speed retarding means comprising a pair of driven cylindrical members, each of the members mounted on a vertical axis and each located on opposite sides of the first conveyor means and disposed to engage the opposite ends of articles in a stack, said transfer means discharging each article from the composite stack by gravity from the downstream end of said first conveyor means immediately on release of said article from said speed retarding means.

2. The apparatus of claim 1, wherein said transfer means comprises chute means interconnecting the downstream end of said first conveyor means with a receiving means.

3. The apparatus of claim 2, and including guide means spaced from the downstream end of said first conveyor means to guide the articles into said chute means.

4. The apparatus of claim 1, wherein said driven members are rollers mounted on the vertical axes, said rollers disposed to rotate in the same direction as and at a slower speed than said first conveyor means.

5. The apparatus of claim 4, and including biasing means for biasing at least one of said rollers laterally inward towards said first conveyor means.

6. The apparatus of claim 1, wherein at least one resilient O-ring is mounted on the outer surface of each cylindrical member and disposed to engage said opposite ends of the articles.

* * * * *